(No Model.)
J. DELVAILLE.
COMBINED HOE AND RAKE HANDLE.
No. 463,108. Patented Nov. 10, 1891.
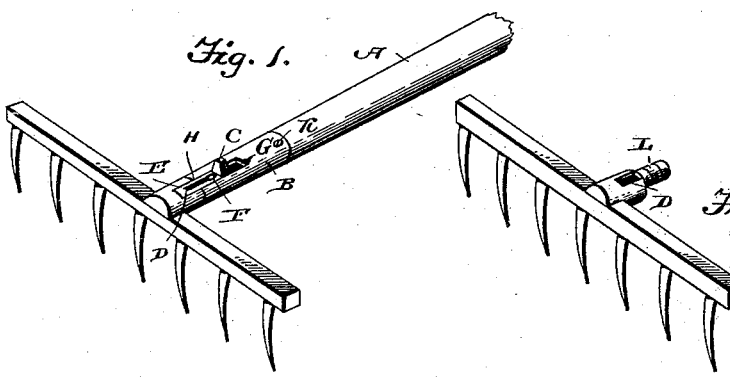
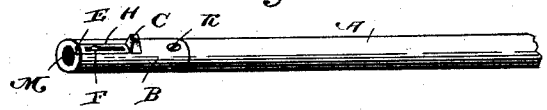
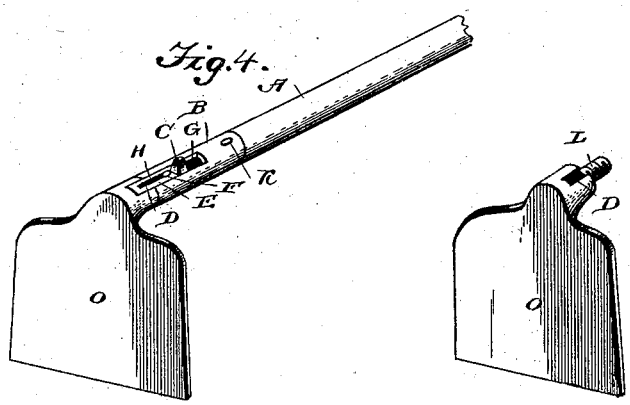
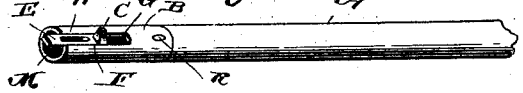
Witnesses:
Inventor:
Jules Delvaille.
By W. R. Stringfellow
Attorney.

UNITED STATES PATENT OFFICE.

JULES DELVAILLE, OF FOSTER, LOUISIANA.

COMBINED HOE AND RAKE HANDLE.

SPECIFICATION forming part of Letters Patent No. 463,108, dated November 10, 1891.

Application filed October 12, 1889. Renewed August 7, 1890. Again renewed August 6, 1891. Serial No. 401,891. (No model.)

*To all whom it may concern:*

Be it known that I, JULES DELVAILLE, a citizen of the United States, residing at Foster, in the parish of Orleans and State of Louisiana, have invented certain new and useful Improvements in a Combined Hoe and Rake Handle; and I do declare the following to be a full, clear, and exact description of the invention, such as will enable others skilled in the art to which it appertains to make and use the same.

My invention relates to an improvement in a handle for a hoe and rake in which an eyeless hoe or rake is made to operate in conjunction with a tubular attachment with a slide thereon; and the objects of my improvements are to provide a hoe or rake handle which can be readily adjusted and that will remain in a positive position. I attain these objects by the mechanism illustrated in the accompanying drawings, in which—

Figure 1 is a perspective view of rake with handle attached. Fig. 2 is a perspective view of rake with handle detached. Fig. 3 is a perspective top view of handle with slide drawn back. Fig. 4 is a perspective end view of hoe with handle attached. Fig. 5 is a perspective end view of hoe with handle detached. Fig. 6 is a perspective top view of handle with slide extended.

Similar letters refer to similar parts throughout the several views.

In constructing my handle I use a piece of metal pipe, as shown by B—say five inches in length and one inch in diameter. One end of said pipe, as designated by M, is threaded, and the opposite end forms a socket for wooden handle A, said handle being held in position by means of screw K. Upon the exterior of B, I adjust a slide, as shown by E, and is so constructed as to move back and forth by means of projection C within the slot G. Within the slide E is also a slot H, which, engaging the stop F, prevents the slide E from being drawn entirely out of slot G.

D is a slot on hoe and rake in which slide E rests when B is adjusted.

L are threaded ends upon hoe and rake, which are cast in a solid piece and upon which threaded ends M of B are screwed.

N is a rake and O a hoe.

In practice I take metal piece B, as shown in Fig. 3, and adjust it to L, as shown in Figs. 1 and 4, pushing slide H into position within slot D by means of projection C, where it is securely held in position. The handle A, which is preferably of wood, is driven into socket in end of B and the screw K placed in position. A striking advantage of my invention is that the handle of hoe and rake is held in a rigid position, and one handle can be used for two or more agricultural implements.

Having fully described my invention, what I claim, and desire to secure by Letters Patent, is—

In a combined hoe and rake handle, the tubular attachment B, with end of same threaded for enabling the threaded portion of a hoe or rake to be readily attached, in combination with the slide E and slot D, as set forth.

In testimony whereof I affix my signature in presence of two witnesses.

JULES DELVAILLE.

Witnesses:
HELMUTH HOLTZ,
PERCY D. PARKS.